United States Patent Office 3,632,578
Patented Jan. 4, 1972

3,632,578
CLEAVAGE OF ACYLAMIDOCEPHALOSPORINS
AND ACYLAMIDOPENICILLINS
Robert R. Chauvette, Indianapolis, Ind., assignor to Eli
Lilly and Company, Indianapolis, Ind.
No Drawing. Filed Sept. 9, 1968, Ser. No. 758,600
Int. Cl. C07d 99/16, 99/24
U.S. Cl. 260—243 C
13 Claims

ABSTRACT OF THE DISCLOSURE

The acyl group is removed from 7-acylamidocephlosporins and 6-acylamidopenicillins by treating with phosphorus pentasulfide to obtain the thioamide, converting the thioamide to an imino intermediate, and hydrolyzing the imino intermediate to the corresponding free amine.

BACKGROUND OF THE INVENTION

It is well known that the biological activity can be varied within the cephalosporin and penicillin families of antibiotics by changing the acyl portion of the 7-acylamido and 6-acylamido groups of the cephalosporin and penicillin families, respectively. In order to change these groups it is often necessary first to remove the acyl group that is present in the molecule. Such side chain removal results in the preparation of a free amine which can then be reacylated with a desired group.

The removal of an acyl group is particularly important in cephalosporin chemistry. Cephalosporin C, a product of fermentation as described in British Pat. 810,-196, has a low order of biological activity and must be chemically converted to more active antibiotics. This conversion involves removal of the 5' - amino - N'-adipoyl group from cephalosporin C and substitution of other acyl groups in its place. Processes for this removal of the acyl group from cephalosporin C are described in U.S. Pats. Nos. 3,188,311 and 3,367,933.

SUMMARY

I have now discovered a method for the removal of acyl groups from 7-acylamidocephalosporins or 6-acylamidopenicillins to obtain the corresponding amino compounds. My method is a general one that can be applied to any 7-acylamidocephalosporin or 6-acylamidopenicillin with due regard for the nature of the substituent groups in the molecule. Substituents that could also react with phosphorus pentasulfide would necessitate blocking if these groups are to be preserved in the final product or necessitate larger excesses of phosphorus pentasulfide if their competing reactivity is of no consequence to the final product.

The first step in my process involves the conversion of the 7-acylamidocephalosporin or 6-acylamidopenicillin to the corresponding thioamide by treatment with at least 0.2 mole (one equivalent) of phosphorus pentasulfide at a temperature within the range of 0° to 100° C. The thioamide is then converted to an iminothioester by treatment with an organic active halogen compound at a temperature of 0° to 100° C. or, alternatively, the thioamide may be oxidized to the corresponding iminodisulfide. Either the iminothioester or the iminodisulfide is converted to the amino compound by hydrolysis under acid conditions. The thioamide is a critical intermediate in my process and may be converted to the amino compound by either of two procedures.

DESCRIPTION OF THE PREFERRED EMBODIMENT

The compound to be treated by my process is a 7-acylamidocephalosporin or 6 - acylamidopenicillin. Typical cephalosporins may be represented by Formula I while typical penicillins may be represented by Formula II.

(I) 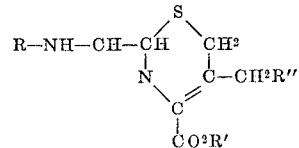

(II) 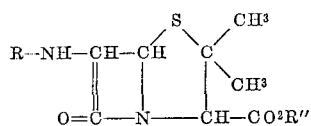

In the formulas, R is an acyl group of the type normally found in cephalosporins and penicillins such as, for example, phenylacetyl, phenoxyacetyl, 5 - aminoadipoyl, 5 - diphenylmethoxycarbonyl - 5 - phthalimidovaleryl, and p-methoxyphenylacetyl. The carboxyl groups may be present as free acids, in which case R' is hydrogen, or may be present as esters, in which case R' is a silyl group or an alkyl or substituted alkyl group containing from 1 to 20 carbon atoms. It is common practice in working with cephalosporins and penicillins to protect the carboxyl group by esterification with a group that can be easily removed later to regenerate the free acid. Typical of such groups are, for example, diphenylmethyl, t-butyl, p-methoxybenzyl, silyl, and 2,2,2 - trichloroethyl. Other ester groups such as methyl, ethyl, and benzyl, may also be employed. In the cephalosporin series R" may be hydrogen or a functional group such as hydroxy or acetoxy. It is to be understood that these formulas are merely representative of the general class of compounds containing the cephalosporin or penicillin nucleus and bearing an acylamido group in the 7- or 6-position, respectively.

In the first step of my process the amide group in the molecule is converted to a thioamide by treatment with phosphorus pentasulfide. I have found there to be some variation in the amount of phosphorus pentasulfide needed to treat the various amides employed. For example, in the penicillin series as little as 0.2 mole of phosphorus pentasulfide per mole of penicillin may be used. However, about 0.4 mole is preferred. In the cephalosporin series at least about one mole of phosphorus pentasulfide should be used with the preferred amount being about 1.1 moles. Larger excesses of the phosphorus pentasulfide can be used in any case, but from a practical standpoint no more than about three moles will be used. The phosphorus pentasulfide may be added in one portion or in several portions over a period of time.

The preparation of the thioamide proceeds smoothly over a wide range of temperatures such as from 0° to 100° C. The optimum temperature will vary with the particular amide being treated. With the penicillins, for example, the reaction proceeds readily at temperatures within the range of about 20° to 30° C. This same temperature range is preferred when working with cephalosporins wherein R" in Formula I is an acetoxy group. Those compounds in which R" is hydrogen are less reactive and temperatures of 50° to 80° C. are preferred.

As one might expect, the preparation of the thioamide proceeds more smoothly if it is conducted in an inert solvent. Suitable inert solvents include aromatic hydrocarbons such as benzene, toluene, or xylene. The reaction may be allowed to proceed for from 1 to 24 hours. In general, the reaction will be complete within 2 to 4 hours.

After the thioamide has been obtained it is possible to proceed in either one of two ways to prepare the free amine by cleavage of the thioamide. In the preferred procedure the thioamide is treated with an organic active halogen compound to obtain an intermediate iminothioester in accordance with the following equation:

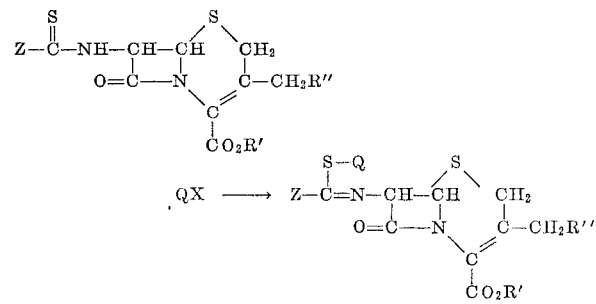

wherein X is halogen, Q is the residue of the organic active halogen compound, and Z is the residue of an acyl group. By residue of an acyl group is meant all the acyl group except the carbonyl function. Z may be such groups, for example, as benzyl, phenoxymethyl, m-chlorobenzyl, and p-methoxybenzyl.

The organic active halogen compound to be employed is one that will react with the sulfhydryl group of the enol form of the thioamide to yield the iminothioester. A skilled organic chemist will know which organic halogen compounds are sufficiently reactive to react as depicted in the equation. In general, halogen atoms attached to primary and secondary aliphatic carbon atoms will undergo reaction. On the other hand, halogen atoms attached to aromatic carbon atoms generally are not sufficiently reactive to enter into the reaction. Therefore, the organic halogen compound employed will usually be an aliphatic chloride, bromide, or iodide. Typical organic halogen compounds that may be used include methyl iodide, benzyl bromide, chloroacetone, chloromethyl methyl ether, phenacyl bromide, and allyl chloride. Methyl iodide is preferred because of its ready availability and high reactivity.

At least about one mole of active halogen compound should be used per mole of thioamide. Preferably, an excess of the halogen compound is used to help in driving the reaction to completion. Thus, as much as a fifty-fold excess, or more, may be employed.

Although the reaction of the halogen compound with the thioamide will proceed in the absence of a base, it is preferred to use a weak base or other acid acceptor to take up the hydrogen halide evolved. Suitable weak bases include sodium bicarbonate, sodium carbonate, and alkali or alkali earth oxides. Sodium bicarbonate is preferred. It is also preferred to conduct the reaction in an inert, organic solvent. Typical solvents that may be employed include benzene, toluene, acetone, methyl ethyl ketone, ethylene chloride, and methylene chloride.

The reaction may be conducted at a temperature within the range of 0° to 100° C. and preferably within the range of 40° to 50° C. Reaction times of 2 to 24 hours may be used. Long reaction times on the order of 12 hours or more are preferred.

The iminothioester need not be isolated but may be directly subjected to hydrolysis under acidic conditions. Hydrolysis to the free amine readily occurs at an acid pH, preferably a pH below about 3. Hydrolysis may be effected, for example, by evaporation of the reaction solvent from the iminothioester preparation followed by treatment of the residue with dilute aqueous mineral acid such as hydrochloric acid. Hydrolysis of the iminothioester is depicted by the following equation:

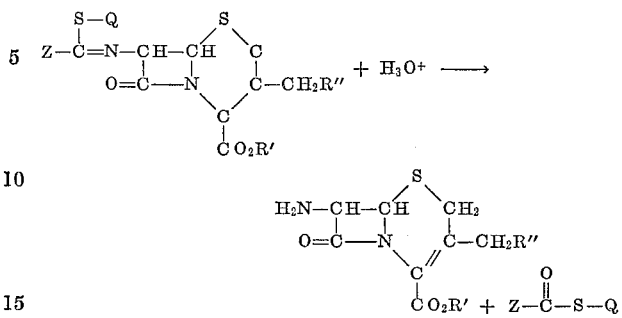

The free amine may then be recovered from the aqueous solution by any desired means. For example, the reaction mixture may be slurried with an organic solvent such as ethyl acetate while the pH is being adjusted by the addition of a base. The free amine is extracted from the aqueous phase to the organic phase, if the carboxyl group is in the form of an ester, and may then be recovered by evaporation of the organic solvent. If desired, a sulfonic acid can be added to the organic solution to precipitate the sulfonic acid salt of the amine. It is to be understood that the method of recovery of the free amino compound does not form a part of my invention.

As an alternative to proceeding through the iminothioester, the thioamide may be oxidized to an iminodisulfide which is then hydrolyzed to the free amine. Once again, the reaction appears to proceed through the enol form of the thioamide so that the oxidation is the well-known oxidation of a sulfhydryl compound to a disulfide. The oxidation of a sulfhydryl group to a disulfide occurs readily under mild oxidizing conditions. Oxidizing agents that may be used include oxygen, ferric chloride, hydrogen peroxide, boron trifluoride with lead tetraacetate, positive halogen compounds, and halogens themselves. Positive halogen compounds are well known in the art and include such materials as N-bromosuccinimide, N-chlorosuccinimide, N-bromophthalimide, N-chlorophthalimide, N-bromoacetamide, and the like. Elemental halogens such as chlorine, bromine, and iodine may also be used as oxidizing agents. Iodine is a preferred oxidizing agent for my process. A typical oxidation of a thioamide to an iminodisulfide is shown in the following equation.

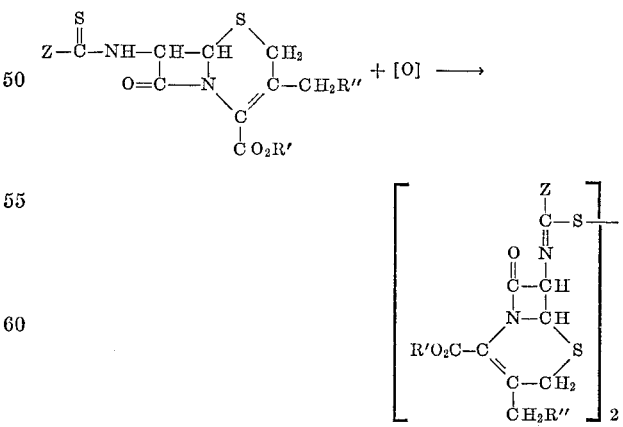

The conditions under which the oxidation is run will depend upon the oxidizing agent chosen. In general, mild conditions will suffice. For example, the temperature may be within the range of 0° to 100° C. An inert solvent is preferably employed in the reaction. Such an inert solvent may be an aromatic hydrocarbon such as benzene, toluene, or xylene, or an alcohol such as methanol or ethanol. The length of time required for the reaction will depend upon the oxidizing agent and the other conditions. In general, the reaction will be complete within 24 hours and usually within two to four hours.

At the completion of the oxidation reaction the iminodisulfide is hydrolyzed in the same manner as the iminothioester to obtain the amino compound. This hydrolysis is effected by treating the iminodisulfide with water at a pH of less than about 3. The hydrolysis may be conducted in water alone but is preferably conducted in a mixed solvent system of an organic solvent and water. Suitable organic solvents include acetone, ethanol, and tetrahydrofuran. The low pH is obtained by the addition of an acid such as hydrochloric acid or phosphoric acid. Upon completion of the hydrolysis the amino compound may be recovered as described hereinabove.

My process will be further illustrated by the following examples. The first six examples illustrate the preparation of thioamides. The other examples illustrate alternate methods of proceeding from the thioamide to the amine.

EXAMPLE 1

A solution of 970 mg. (2 mmoles) of 2,2,2-trichloroethyl 3 - methyl-7-[α-(phenoxy)acetamido]-Δ³-cephem-4-carboxylate in 50 ml. of dry benzene was prepared. To this solution was added 490 mg. (2.2 mmoles) of phosphorus pentasulfide and the mixture was stirred under reflux in a nitrogen atmosphere for two hours. After cooling to room temperature the benzene solution was decanted from insoluble materials and then extracted successively with water, 5 percent hydrochloric acid, 5 percent sodium bicarbonate solution, and water. The benzene solution was then dried over magnesium sulfate and evaporated in vacuo. The residue was crystallized from ethanol to give a product with a melting point of 145° C.

In thin-layer chromatography using a silica gel plate, a 7:3 benzene-ethyl acetate system for development, and an iodine chamber to visualize the spots, the product was found to be one-spot material moving slightly ahead of the starting material used as a standard in an adjacent lane. The nuclear magnetic resonance, infrared, and ultraviolet spectra were consistent with a thioamide structure. An electrometric titration (in 66 percent aqueous dimethylformamide) showed a titratable group at 11.2, which is typical of a thioamide in the enol form.

*Analysis.*—Calculated for $C_{18}H_{17}Cl_3N_2O_4S_2$ (percent): C, 43.59; H, 3.46; Cl, 21.45; N, 5.65; S, 12.93. Found (percent): C, 43.27; H, 3.74; Cl, 21.21; N, 5.53; S, 12.83.

EXAMPLE 2

To a solution of 10 g. (21 mmoles) of 2,2,2-trichloroethyl 3 - methyl-7-[α-(phenoxy)acetamido]-Δ³-cephem-4-carboxylate in 300 ml. of dry benzene was added 5.1 g. (23 mmoles) of phosphorus pentasulfide and the mixture was stirred at 50° C. under nitrogen for 2½ hours. A thin-layer chromatogram of a sample from the reaction mixture showed an 80 to 90 percent conversion of O-amide to S-amide. After cooling to room temperature the benzene solution was decanted, washed with water, dried over magnesium sulfate, and concentrated to a smaller volume in vacuo. The product crystallized directly from the benzene concentrate and recrystallized from ethanol in 50 percent yield with a melting point of 145° C.

EXAMPLE 3

2,2,2-trichloroethyl 3-methyl-7-[α-(phenyl)acetamido]-Δ³-cephem - 4 - carboxylate was treated with phosphorus pentasulfide as described in Example 2. In thin-layer chromatography a sample from the reaction mixture showed the resulting thioamide as single-spot material moving slightly ahead of the starting material used as a standard in the adjacent lane. The product was isolated as described in Example 2. The nuclear magnetic resonance spectrum of the isolated product was consistent with the thioamide structure. An electrometric titration (in 66 percent aqueous dimethylformamide) showed a titratable group at 11.1, typical of a thioamide, enol form.

EXAMPLE 4

To a solution of diphenylmethyl 7-[5-diphenylmethoxycarbonyl - 5 - (phthalimido)valeramido]cephalosporanate (1.1 g., 1.25 mmoles), in 15 ml. of dry tetrahydrofuran and 50 ml. of dry benzene was added 620 mg. (2.8 mmoles) of phosphorus pentasulfide in one portion and the mixture was stirred for two hours at room temperature. At the end of this time a sample of the reaction mixture was examined by thin-layer chromatography. The chromatogram was a single spot of a slightly faster-moving material than the starting material indicating the reaction was complete. The solution was decanted from insolubles, and the solvents were removed by evaporation. The residue was taken up in chloroform, the solution washed with water, dried over magnesium sulfate, and evaporated to an oil. This oil crystallized on standing. Recrystallization from acetone-water or ethanol-water gave pure product melting at 145° to 147° C. The nuclear magnetic resonance, infrared, and ultraviolet spectra were consistent with the expected thioamide. An electrometric titration showed a titratable group at 11.5.

*Analysis.*—Calculated for $C_{50}H_{43}N_3O_9S_2$ (percent): C, 67.17; H, 4.85; N, 4.70. Found (percent): C, 66.96; H, 5.04; N, 4.84.

EXAMPLE 5

A solution of 550 mg. (0.61 mmole) of the same starting material as used in Example 4 was dissolved in 30 ml. of dry tetrahydrofuran. To this solution was added 156 mg. (0.7 mmole) of phosphorus pentasulfide and the mixture was stirred in a water bath at 50° C. for two hours. The solvent was then evaporated in vacuo. The residue was taken up in ethyl acetate, the mixture was filtered to remove insoluble impurities, and was washed successively with water, 5 percent hydrochloric acid, 5 percent sodium bicarbonate solution, and water, dried over magnesium sulfate, and evaporated to dryness in vacuo. The residue in thin-layer chromatography was a single-spot material with a mobility corresponding to the desired thioamide.

EXAMPLE 6

The trichloroethyl ester of benzyl penicillin (1 g., 2.2 mmoles), was dissolved in 50 ml. of dry benzene. About 1 g. of sand was added to disperse the reagent better. To the mixture was added 200 mg. (0.9 mmole) of phosphorus pentasulfide in one portion. The mixture was stirred at room temperature for two hours. The benzene solution was decanted, washed successively with water, 5 percent hydrochloric acid, 5 percent sodium bicarbonate solution, and water, and dried over magnesium sulfate. Evaporation to dryness in vacuo left an amorphous solid which by thin-layer chromatography was mainly the desired thioamide with trace amounts of two additional materials, but no unreacted starting ester.

EXAMPLE 7

The product from Example 2 (220 mg., 0.44 mmole) was dissolved in 50 ml. of dry acetone and the solution stirred in a water bath at 60° C. under nitrogen. To the stirred solution was added 2.5 g. (30 mmoles) of sodium bicarbonate. After 15 minutes the suspension was violet colored. To the suspension was added 3.4 g. (24 mmoles) of methyl iodide. The resulting suspension turned pink. Stirring and heating were maintained overnight, and then the insolubles were separated by filtration. The solvent was removed by evaporation in vacuo leaving a residual oil which was redissolved in 10 ml. of 0.1 N hydrochloric acid. This solution was slurried with 25 ml. of ethyl acetate while the pH of the mixture was adjusted from an initial value of 1.25 to near 7 with 1 N sodium hydroxide. The ethyl acetate layer was separated, dried over magnesium sulfate, and concentrated in vacuo to about 10 ml. Treatment with 100 mg. (0.53 mmole) of p-toluene sulfonic acid in 10 ml. of ethyl acetate gave a 90 percent yield of a crystalline precipitate. The nuclear magnetic resonance spectrum of this product was identical to that of an authentic sample of 2,2,2-trichloroethyl 7-amino-3-methyl-Δ³-cephem-4-carboxylate p-toluene sulfonic acid salt prepared by an alternate route.

EXAMPLE 8

The product from Example 2 (300 mg., 0.6 mmole), was dissolved in 20 ml. of methylene chloride containing 2.28 g. (16 mmoles) of methyl iodide and the solution was heated under reflux overnight. The solvent and excess reagent were removed by evaporation. The residue was redissolved in 10 ml. of water and 20 ml. of tetrahydrofuran to give a solution having a pH of 2.1. This solution was allowed to stand at room temperature for 20 minutes for hydrolysis of the imino-thioester intermediate. The tetrahydrofuran was distilled from the mixture in vacuo. The oily aqueous residue was slurried with ethyl acetate and the mixture stirred while the pH was adjusted to near 7 with 1 N sodium hydroxide. The ethyl acetate solution was separated, dried over magnesium sulfate, and concentrated in vacuo to about 5 ml. Addition of 114 mg. (0.6 mmole) of p-toluene sulfonic acid in 15 ml. of ethyl acetate precipitated the product as a crystalline material in 32 percent yield. The product was shown by thin-layer chromatography to correspond exactly with the expected amine salt.

EXAMPLE 9

To a solution of 500 mg. (1 mmole) of the product from Example 2 in 25 ml. of dry acetone was added 4.2 g. (50 mmoles) of sodium bicarbonate and the suspension was stirred in a water bath at 50° C. for 15 minutes. To the suspension was added 185 mg. (2 mmoles) of chloroacetone and stirring and heating were continued overnight. After removal of the insolubles by filtration the acetone was removed in vacuo. The residue was taken up in 0.1 N hydrochloric acid and ethyl acetate, and this mixture was maintained at room temperature to allow hydrolysis of the imino-thioester. The pH was then adjusted to near 7 with sodium hydroxide solution and the ethyl acetate layer was separated, dried over magnesium sulfate, and concentrated under reduced pressure to about 20 ml. To this solution was added 190 mg. (1 mmole) of p-toluene sulfonic acid in 10 ml. of ethyl acetate to precipitate the product. The nuclear magnetic resonance and infrared spectra of this product were consistent with the proposed structure.

EXAMPLE 10

A solution of 750 mg. (0.84 mmole) of the product from Example 4 in 130 ml. of dry acetone was treated with methyl iodide and sodium bicarbonate at reflux temperature overnight. After cooling to room temperature the reaction mixture was filtered and evaporated to dryness in vacuo. The residue was taken up in 10 ml. of 0.1 N hydrochloric acid and 25 ml. of ethyl acetate. While this mixture was stirred the pH was adjusted to 6.8 using 1 N sodium hydroxide. The ethyl acetate layer was separated, dried over magnesium sulfate, and concentrated to about 15 ml. To this solution was added 190 mg. (1 mmole) of p-toluene sulfonic acid and 10 ml. of ethyl acetate. The product crystallized in several crops over the next several hours. The first crop, weighing 35 mg., was one-spot material in thin-layer chromatography corresponding exactly with an authentic sample of diphenylmethyl 7-amino cephalosporanate p-toluene sulfonic acid salt prepared by an alternate route. The infrared spectrum of this product was superimposable upon that of the authentic sample.

EXAMPLE 11

A few crystals of iodine were added to a solution of 300 mg. (0.6 mmole) of the product from Example 2 in 30 ml. of ethanol and the mixture was heated under reflux for two hours. The solvent was evaporated in vacuo and the residue was redissolved in 10 ml. of water and 20 ml. of tetrahydrofuran. This solution was allowed to stand at room temperature for 20 minutes for hydrolysis of the imino-disulfide. The organic solvent was evaporated and the aqueous residue was slurried with ethyl acetate. While the mixture was stirred the pH was adjusted to near 7 with 1 N sodium hydroxide. The ethyl acetate layer was separated, dried over magnesium sulfate, and concentrated to about 15 ml. To this solution was added a solution of 114 mg. (0.6 mmole) of p-toluene sulfonic acid in 15 ml. of ethyl acetate. Immediately the p-toluene sulfonic acid salt of 2,2,2-trichloroethyl 7-amino-3-methyl-Δ³-cephem - 4 - carboxylate crystallized from the mixture. The product was recovered by filtration and dried to give 35 mg. (13 percent yield) of the salt. The nuclear magnetic resonance spectrum of the product was consistent with the expected structure.

My process may be practiced as a whole, or the various steps may be practiced separately. For example, the first step of the process may be used to prepare thioamides from acylamidocephalosporins and acylamidopenicillins without then further subjecting the thioamide to additional steps in order to prepare the corresponding amino compound. By the same token, one may start with a thioacylamido compound prepared by any procedure and convert the thioacylamide to an amine by either of the alternate routes described by me. The two routes differ only in the method of treating the thioamide and the type of intermediate imino compound obtained from the thioamide. Once the imino compound is obtained it is subjected to acidic hydrolysis to obtain the amine.

The thioamides prepared by me are novel compounds which are useful intermediates in the preparation of the corresponding amino compounds which in turn may be acylated to yield known useful antibiotics. These novel thioamides may be represented by one of the following formulas:

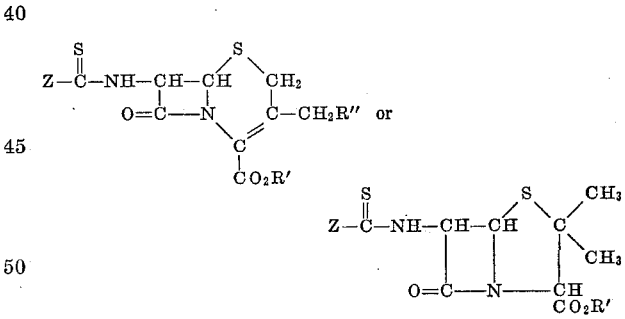

The carboxyl group in these formulas may exist as a free acid or as an ester. Thus R' may be hydrogen, a silyl group, or an alkyl or substituted alkyl group containing from 1 to 20 carbon atoms. Among the substituent groups that may be present are halo, phenyl, halophenyl, and alkoxyphenyl. It is frequently the case that the carboxyl group is protected during chemical reactions occurring at other positions in the molecule by converting the carboxyl group into an ester. Among the commonly employed blocking groups are the 2,2,2-trichloroethyl, diphenylmethyl, p-methoxybenzyl, silyl, and t-butyl groups. R' may also be such groups as methyl, ethyl, and benzyl. R'' in the cephalosporin series may be hydrogen, hydroxy, or acetoxy.

Z in the above formulas represents the residue of an acyl group that may be present in a cephalosporin or penicillin. By residue of an acyl group is meant all of the acyl group except the carbonyl function. Acyl groups commonly found in cephalosporins and penicillins include those in which Z would have one of the following structures:

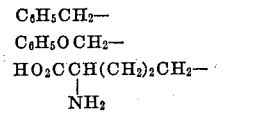
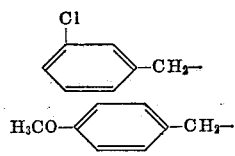
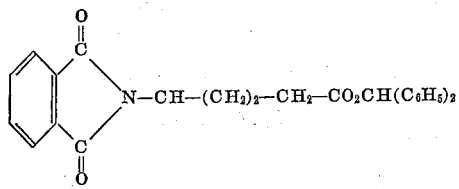

It is to be understood that the values assigned to Z, R', and R" in the thioamide structures are merely illustrative and are not intended to be limiting. Those persons skilled in the cephalosporin and penicillin arts will have no difficulty in applying my invention to cephalosporins and penicillins not specifically disclosed herein. However, my invention is a broad one that is applicable to cephalosporins and penicillins in general, and the thioamides coming within the genus of my invention are those derivable from cephalosporins and penicillins.

Novel thioamides of my invention having particular importance are those having the following structures:

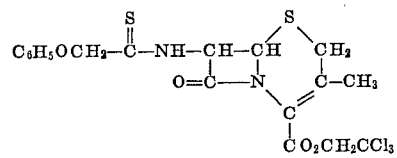
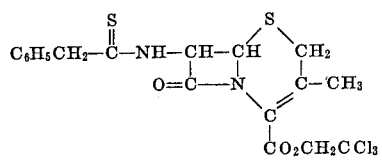
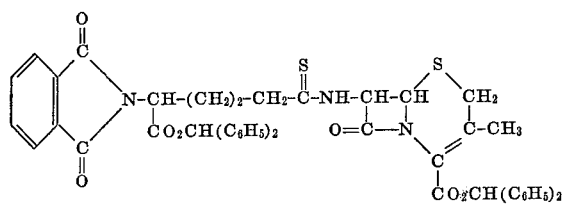
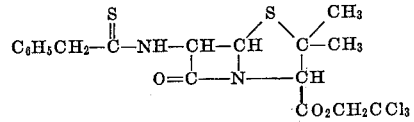

I claim:
1. A method for the conversion of an acylamido compound selected from the class consisting of 7-acylamidocephalosporins and 6-acylamidopenicillins to the corresponding thioamide which comprises treating said acylamido compound with at least about 0.2 mole of phosphorus pentasulfide at a temperature within the range of 0° to 100° C.
2. A method for the conversion of a thioacylamido compound selected from the class consisting of 7-thioacylamidocephalosporins and 6-thioacylamidopenicillins to the corresponding amino compound by the removal of the thioacyl group therefrom which comprises treating the thioacylamido compound with at least about one mole of an organic active halogen compound at a temperature within the range of 0° to 100° C. to convert the thioacylamido compound to an iminothioester and treating the iminothioester with water under acidic conditions to effect hydrolysis to the amino compound.
3. A method for the conversion of a thioacylamido compound selected from the class consisting of 7-thioacylamidocephalosporins and 6-thioacylamidopenicillins to the corresponding amino compound by the removal of the thioacyl group therefrom which comprises oxidizing the thioacylamido compound to the corresponding iminodisulfide and treating the iminodisulfide with water under acidic conditions to effect hydrolysis to the amino compound.
4. A method for the conversion of an acylamido compound selected from the class consisting of 7-acylamidocephalosporins and 6-acylamidopenicillins to the corresponding amino compound by the removal of the acyl group therefrom which comprises:
(A) treating said acylamido compound with at least about 0.2 mole of phosphorus pentasulfide at a temperature within the range of 0° to 100° C. to obtain the corresponding thioamide;
(B) treating the thioamide with at least about one mole of an organic active halogen compound at a temperature within the range of 0° to 100° C. to convert the thioamide to an iminothioester; and
(C) treating the iminothioester with water under acidic conditions to effect hydrolysis to the amino compound.
5. A method as in claim 4 wherein the active halogen compound is methyl iodide.
6. A method as in claim 4 wherein an acid acceptor is included in step B to take up the hydrogen halide evolved.
7. A method as in claim 6 wherein the active halogen compound is methyl iodide.
8. A method as in claim 7 wherein the acid acceptor is sodium bicarbonate.
9. A method for the conversion of an acylamido compound selected from the class consisting of 7-acylamidocephalosporins and 6-acylamidopenicillins to the corresponding amino compound by the removal of the acyl group therefrom which comprises:
(A) treating said acylamido compound with at least about 0.2 mole of phosphorus pentasulfide at a temperature within the range of 0° to 100° C. to obtain the corresponding thiomide;
(B) oxidizing the thioamide to the corresponding iminodisulfide; and
(C) treating the iminodisulfide with water under acidic conditions to effect hydrolysis to the amino compound.
10. A thioamide having the formula:

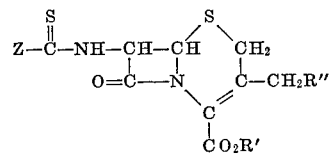
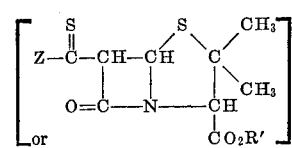

wherein R' is hydrogen, a silyl group, or an alkyl or substituted alkyl group containing from 1 to 20 carbon atoms; R" is hydrogen, hydroxy or acetoxy; and Z is the residue of an acyl group.

11. A thioamide as in claim 10 having the formula:
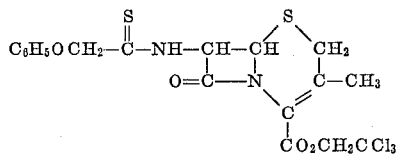
12. A thioamide as in claim 10 having the formula:
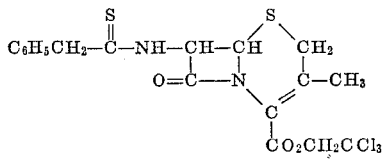
13. A thioamide as in claim 10 having the formula:
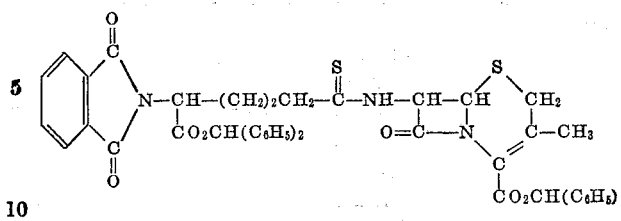
References Cited
UNITED STATES PATENTS
3,487,070   12/1969   Sheehan _____ 260—243 C
3,499,909   3/1970    Weissenburger
                      et al. _____ 260—243 C
NICHOLAS S. RIZZO, Primary Examiner
U.S. Cl. X.R.
260—239.1

UNITED STATES PATENT OFFICE
CERTIFICATE OF CORRECTION

Patent No. 3,632,578          Dated January 4, 1972

Inventor(s) Robert R. Chauvette

It is certified that error appears in the above-identified patent and that said Letters Patent are hereby corrected as shown below:

In column 2, lines 5 through 17, the structures should read as follows:

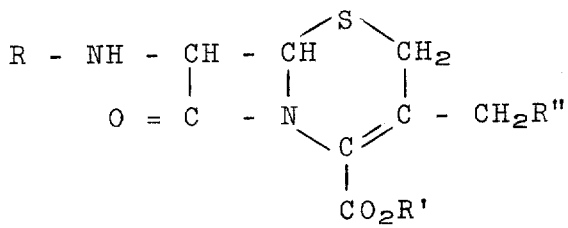    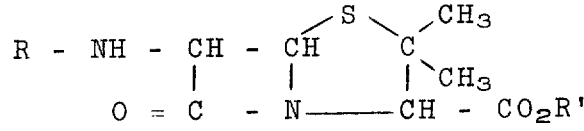

(I)                                (II)

In column 9, lines 15 through 21, the structure should read as follows:

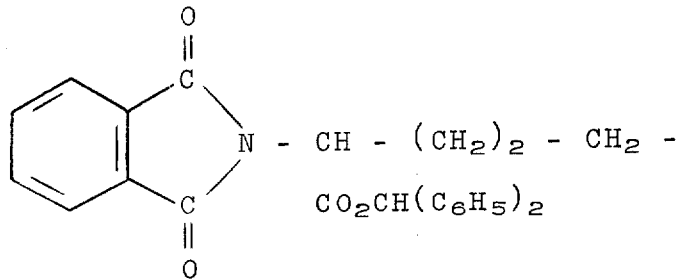

Signed and sealed this 8th day of August 1972.

(SEAL)
Attest:

EDWARD M. FLETCHER, JR.          ROBERT GOTTSCHALK
Attesting Officer                Commissioner of Patents